R. V. MATTISON.
ASBESTOS CEMENT PRODUCT AND METHOD OF FORMING THE SAME.
APPLICATION FILED JULY 6, 1921.
1,423,000. Patented July 18, 1922.
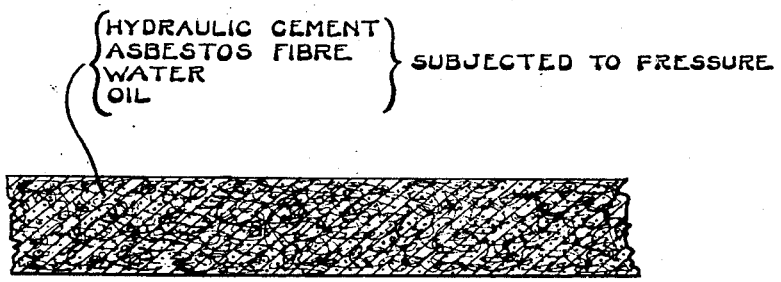
Richard V. Mattison
INVENTOR
BY Edwards, Sager & Bower
ATTORNEYS

UNITED STATES PATENT OFFICE.

RICHARD V. MATTISON, OF AMBLER, PENNSYLVANIA, ASSIGNOR TO ASBESTOS SHINGLE, SLATE & SHEATHING COMPANY, A CORPORATION OF PENNSYLVANIA.

ASBESTOS-CEMENT PRODUCT AND METHOD OF FORMING THE SAME.

1,423,000. Specification of Letters Patent. Patented July 18, 1922.

Application filed July 6, 1921. Serial No. 482,812.

*To all whom it may concern:*

Be it known that I, RICHARD V. MATTISON, a citizen of the United States, residing at Ambler, in the county of Montgomery and State of Pennsylvania, have invented certain new and useful Improvements in Asbestos-Cement Products and Methods of Forming the Same, of which the following is a specification.

This invention relates to asbestos-cement material and particularly to slabs, shingles, blocks, etc., of asbestos-cement composition and to a process of making the same. The chief object of the invention is to provide asbestos-cement material setting as a compact homogeneous mixture of asbestos and cement to give a strong, waterproof product. A further object of the invention is to provide a process for producing the cement product which will be simple and inexpensive in operation and dependable in its results.

The accompanying drawing shows a sectional view of a portion of a cement slab illustrating the invention.

In the process of this invention a dry mixture of hydraulic cement and asbestos material is made by thoroughly stirring the ingredients together. The relative amount of cement may be varied according to the raw materials used and the results desired, the cement being, for instance, a third to a half of the total dry mixture by weight. The asbestos material may be asbestos waste or material consisting of very short asbestos fibres; for instance, it may be four fifths to seven eighths of asbestos waste, a fine powdery material, and one fifth to one eighth of very short asbestos fibres. This asbestos material will be preferably properly disintegrated by a pulverizer so that a very thorough mixture of the cement and asbestos material will result.

To this dry mixture water is then added in sufficient quantity to thoroughly saturate the mass, the water being for instance about twenty per cent of the weight of the dry mixture. The wet mixture is stirred and oil is then added to it and well worked into the mass, for instance in a pug mill. The addition of this oil enables the wet plastic mass to be worked in a way hitherto impossible. Without interfering with the bond between the particles of cement, asbestos and water, the oil spreads throughout the whole of the pulpy, colloidal mass making it stiffer and more tenacious. The oil used is preferably a heavy mineral or nonsaponifiable oil such as Pennsylvania crude or lubricating oil and in amount will most advantageously be about five per cent of the weight of the cement.

The oiled mixture is passed on to an auger machine and pressed out in desired form through a suitable die. Hitherto attempts to press a wet mixture of cement and asbestos through a die have met with great difficulties in maintaining the described smooth homogeneous structure in the material leaving the die. There has been a tendency in pressing the material through the die for the particles to shift with relation to each other so as to disrupt the material and weaken its internal structure, often so seriously as to make the product worthless. With the oiled mixture of this invention the plastic mass takes on clayey properties causing the particles to cohere together in a manner adapting the material for die formation. The mixture flows through the die easily and the oiled material leaving the die is not disintegrated or weakened but maintains a smooth homogeneous composition.

After leaving the die the material is cut into desired lengths and its tenacious clayey character enables it to be further worked and pressed, preferably under high pressure, to remove any excess water and give it a finish after which it is permitted to set in final form, preferably under pressure.

The final product embodies a thorough mixture of cement and asbestos material with a minute intermixture of the oil which becomes impregnated in the composition without preventing the setting of the cement. The result is a compactly pressed, integral material homogeneous at all points and of even strength throughout without any weakened spots due to relative shifting of the particles. The oil being thoroughly mixed into the composition before the cement is set becomes integrally incorporated in the hardened material and tends to render it permanently waterproof.

It is obvious that the relative proportion and character of the ingredients may be varied and while the invention has been described in connection with preferred procedure illustrating the process and product its principle is not confined thereto but is intended to cover such modifications thereof as fall within the scope of the appended claims.

I claim:—

1. A cement composition comprising a homogeneous mixture of oil and asbestos in finely divided condition, water and cement, the same having been subjected to pressure before the cement is set.

2. A cement composition comprising a homogeneous mixture of oil and disintegrated asbestos, water and cement, the mixture having been subjected to a high degree of pressure and allowed to set thereafter.

3. A cement composition comprising a homogeneous mixture of oil, asbestos, water and cement, set after pressure, said oil being sufficient in quantity to waterproof said composition.

4. A process for forming an asbestos cement product comprising mixing asbestos, cement and water with the addition of oil, and subjecting the mixture to pressure before the cement is set.

5. A process for forming an asbestos cement product comprising mixing asbestos, cement and water with the addition of nonsaponifiable oil, and subjecting the mixture to pressure before the cement is set.

6. A process for forming an asbestos cement product comprising mixing asbestos, cement and water with the addition of oil, and subjecting the mixture to pressure before the cement is set, said oil being sufficient in quantity to waterproof said composition.

7. A process for forming an asbestos cement product comprising mixing asbestos, cement and water and adding nonsaponifiable oil, then subjecting the wet mixture to pressure and allowing the cement to set.

8. A process for forming an asbestos cement product comprising mixing asbestos, cement and water, adding oil to the wet mixture, and pressing the oiled mixture through a die orifice in desired form.

9. A process for forming an asbestos cement product comprising mixing asbestos, cement and water, adding oil to the wet mixture, pressing the oiled mixture through a die orifice in desired form, and then pressing the die shaped material and permitting the cement to set.

10. A process for forming an asbestos cement product comprising mixing asbestos, cement and water with the addition of a lubricating medium adapting the final mixture for die formation, and pressing said final mixture through a die orifice in desired form.

11. A process for forming an asbestos cement product comprising mixing asbestos, cement and water with the addition of a lubricating medium adapting the final mixture for die formation, pressing said final mixture through a die orifice in desired form, and then pressing the die shaped material and permitting the cement to set.

RICHARD V. MATTISON.